W. R. URQUHART, C. W. POST, D. E. HUMPHREY, AND C. C. VAN ARSDALE.
VULCANIZING APPARATUS.
APPLICATION FILED OCT. 18, 1920.

1,422,065.

Patented July 4, 1922.

UNITED STATES PATENT OFFICE.

WILLIAM R. URQUHART, OF LOS ANGELES, CALIFORNIA, CLIFFORD W. POST, OF AKRON, DWIGHT E. HUMPHREY, OF CUYAHOGA FALLS, AND CLARENCE C. VAN ARSDALE, OF AKRON, OHIO, ASSIGNORS TO THE GOODYEAR TIRE & RUBBER COMPANY, OF AKRON, OHIO, A CORPORATION OF OHIO.

VULCANIZING APPARATUS.

1,422,065.  Specification of Letters Patent.  Patented July 4, 1922.

Application filed October 18, 1920. Serial No. 417,755.

*To all whom it may concern:*

Be it known that we, WILLIAM R. URQUHART, CLIFFORD W. POST, DWIGHT E. HUMPHREY, and CLARENCE C. VAN ARSDALE, citizens of the United States, residing, respectively, at Los Angeles, in the county of Los Angeles and State of California; Akron, in the county of Summit and State of Ohio; Cuyahoga Falls, in the county of Summit and State of Ohio; and Akron, in the county of Summit and State of Ohio, have invented new and useful Improvements in Vulcanizing Apparatus, of which the following is a specification.

Our invention relates to vulcanizing machines for treating rubber articles by a continuous vulcanizing process.

The various objects and advantages of our invention, including the simplicity of construction, speed and economy of operation, uniformity of product, and reliability of the process, will become apparent from a perusal of the description in conjunction with the accompanying drawings wherein we have illustrated a preferred embodiment of our invention as it has been reduced to practice.

Our invention differs from the conventional practice in that it contemplates the use of a vulcanizing machine in which a continuous and regularly moving stream of uncured tire casings, or other rubber articles, are transported through a vulcanizing oven that is uniformly heated to a predetermined vulcanizing temperature. The speed of travel of the rubber articles through the oven and the temperature of the oven are so adjusted that proper vulcanization results from the transportation of a tire casing through the oven.

Throughout the various figures of the drawings, which illustrate our invention as it has been embodied in a vulcanizing machine, like symbols of reference designate corresponding parts.

Figure 1:
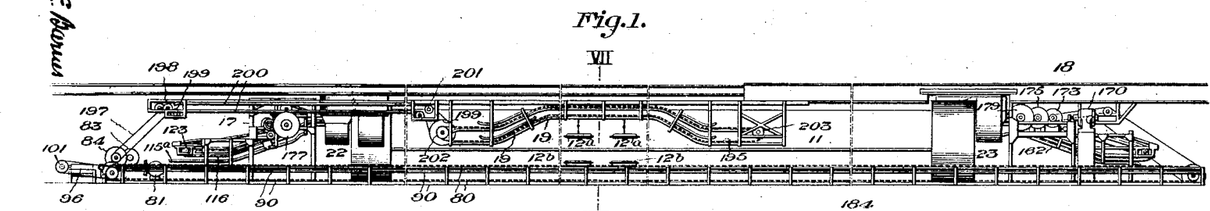
Figure 1 of the accompanying drawings is a side elevational view, shown with parts broken away for the sake of clearness of illustration, of a vulcanizing mechanism constructed in accordance with our invention.
Figure 2:
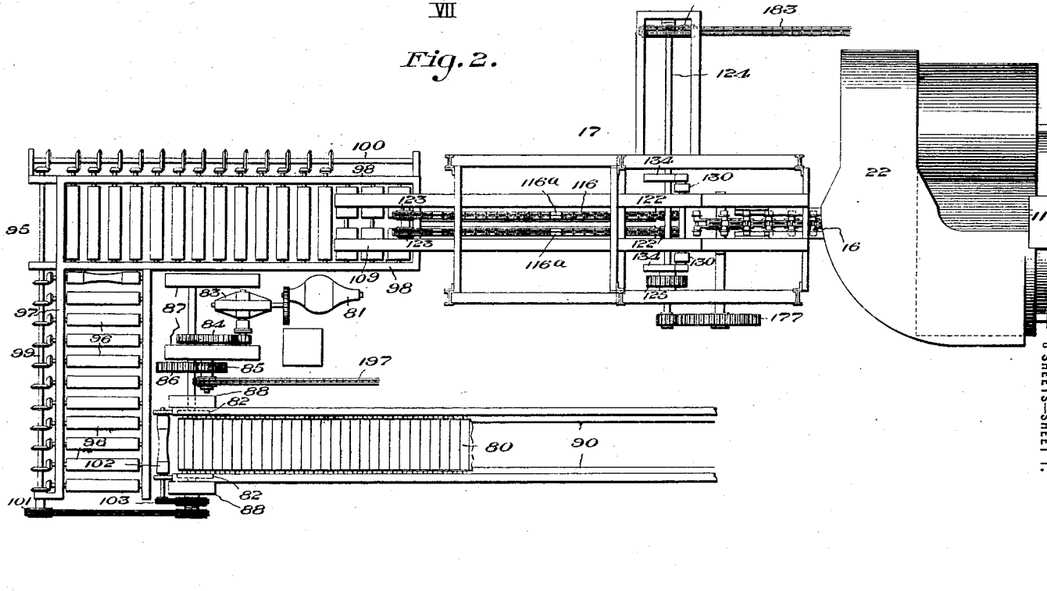
Figure 2 is a top plan view of a portion of the vulcanizing mechanism showing the entrance to the oven and the portions of the conveying and driving mechanisms associated therewith.

A vulcanizing apparatus constructed in accordance with our invention, and as shown in Figs. 1 and 2 of the drawings, embodies a tubular oven 11 through which a continuous stream of molds 12 for tire casings are moved by a conveyor mechanism which includes an overhead oven conveyor 16, a loading section 17, an unloading portion 18 and a mold-separating portion 19.

The curing oven 11, as shown in Figs. 1 to 9 inclusive, is a relatively long tubular structure of substantially circular cross section which is heated by means of a plurality of suitably arranged electrical heating units 21 through which air is circulated by circulation manifold and fan mechanisms 22 and 23 that are placed at the respective ends of the oven and which supply air through longitudinal ducts 24 and the electrical heating units 21 to the interior of the oven.

Figure 7:
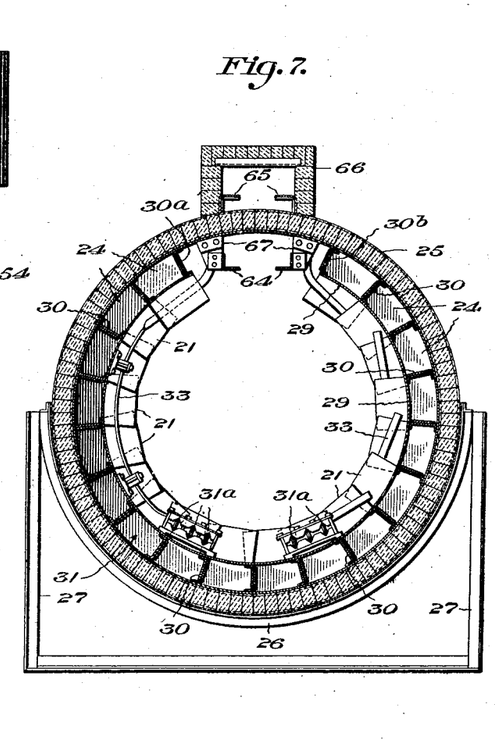
Figure 7 is a lateral sectional elevational view of the heating oven taken substantially on line VII—VII of Figure 1, and representing a section through substantially the center of the oven.

The curing oven, a vertical sectional view of which, taken substantially at the center thereof, is shown in Fig. 7, embodies an outer wall 25 of brick, or other refractory material that is adapted to prevent the dissipation of heat from the oven. The outer wall 25 of the oven is cradled in a semi-cylindrical structure 26, of sheet metal, that is supported by a plurality of equally spaced brackets 27. Interposed circular ribs 28 are utilized to strengthen the wall 25 of the oven. The oven also has an inner shell 29, preferably of sheet metal, which is spaced from the outer wall 25 a sufficient distance to provide a series of longitudinal ducts 24 that are separated from each other by longitudinal partitions 30 which extend from end to end of the oven. A suitable partition or disc 31 extends between the wall 25 and the shell 28, and serves to separate the longitudinal channels or ducts 24 at substantially the center of the oven in order that each section of the oven may have its respective system of longitudinal circulation ducts.

The electrical heating elements 21 are spirally arranged within the oven and mounted on the inner wall 29, each heating element being mounted directly over one of the longitudinal ducts 24 with which it communicates. A damper 32 is placed at the base of each heating element to afford means for controlling the quantity of air which passes into the oven from the longitudinal ducts through communicating apertures in the inner shell 29 of the oven, over which the respective heating elements are mounted.

Figures 3, 10:
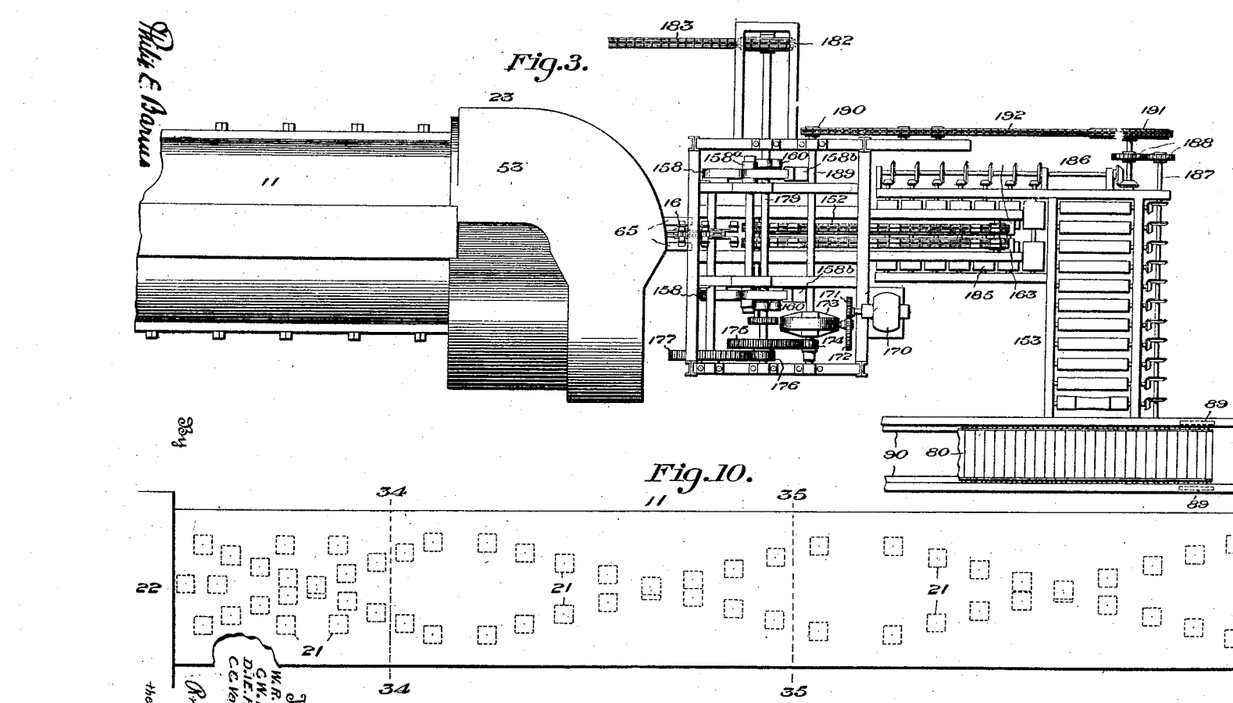
Figure 3 is a top plan view of the conveyor mechanism situated at the unloading or exit end of the curing oven.
Figure 10 is a side elevational view diagrammatically showing the arrangement of heating elements within the oven.

Figure 10 schematically illustrates the general arrangement of the heating elements within the oven. By arranging the heating elements spirally, one spiral starting at the top and one at the bottom of the oven and continuing throughout its length in two spirals within the oven, each circulation duct is adapted to supply air to a proportionate number of heating elements to thus insure a uniform and equal distribution of the circulating air through the oven.

The heating elements may be of any conventional design and are, therefore, merely indicated as a plurality of units 21 that are supplied with electrical energy from bus bars 31ᵃ through suitable strap connectors 33. Each of the heating units has a series of deflecting plates 68 which deflects the circulated air to cause it to move either spirally or longitudinally toward the entrance to the oven according to the setting. This insures that the top and bottom portions of the oven will be uniformly heated.

In order that the molds may be brought to the vulcanizing temperature as quickly as is consistent with the proper operation of the oven, a relatively large number of heaters are grouped at the entrance to the oven by a closer spacing of the heating units at this point and by the addition of auxiliary units in this portion of the oven. This arrangement provides for a greatly increased localization of the heating energy at the entrance to the oven.

The heat units for the oven are also arranged in power groups, as indicated by the dotted lines 34 and 35 of Fig. 10, each group being supplied by an independent set of bus bars and embodying substantially the same number of heating units in order that substantially the same quantity of electrical energy may be consumed by each power group. Each power group of heating units is independent of the other groups and is controlled automatically by a potentiometer heat regulator of conventional design that is governed through suitable thermo couples arranged within the oven. Since apparatus of this nature is well known in the electrical art and since its system of connection and operation will be apparent to those skilled in such work, only a general description and schematic illustration thereof is deemed necessary for a complete understanding of its relation to our invention.

Since each power unit is separately supplied with electrical energy and is separately controlled, it will be apparent that each of these zones of the oven is independently maintained at a predetermined temperature.

The heat that is developed within each of the units is transferred to the oven by the air, or other circulating medium, that is forced through the longitudinal channels 24 and the heating elements 21 into the oven. The continuous circulation of this air in a predetermined path is effected by means of the circulation hoods 22 and 23, which are identical in structure and are disposed at the respective ends of the oven. Each of the circulating mechanisms supplies air to its corresponding portion of the oven since the sets of longitudinal ducts 24 are separated midway of the oven by the partition 31.

Figure 6:
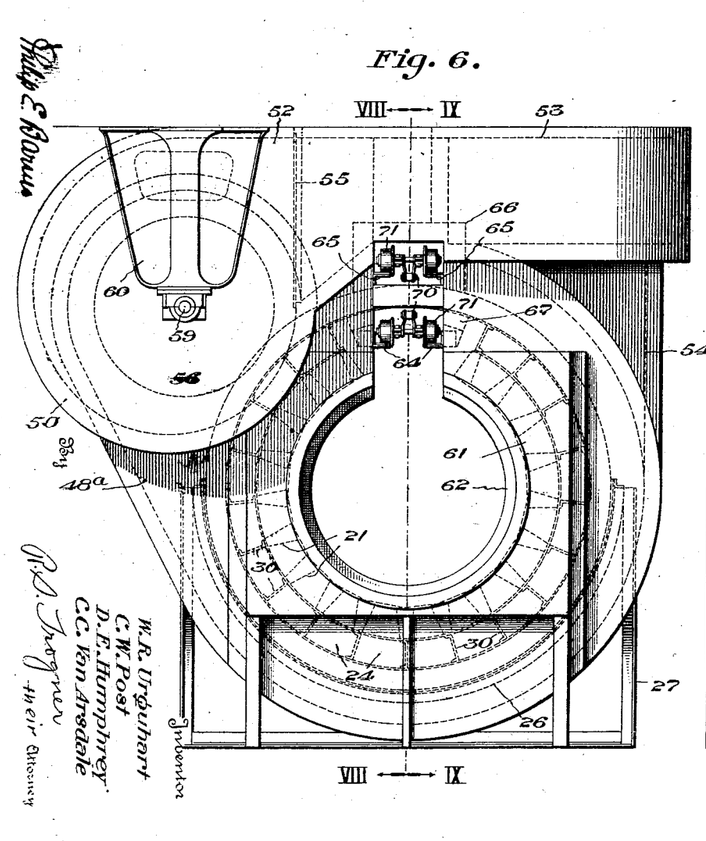
Figure 6 is an end elevational view of the curing oven.
Figure 8:
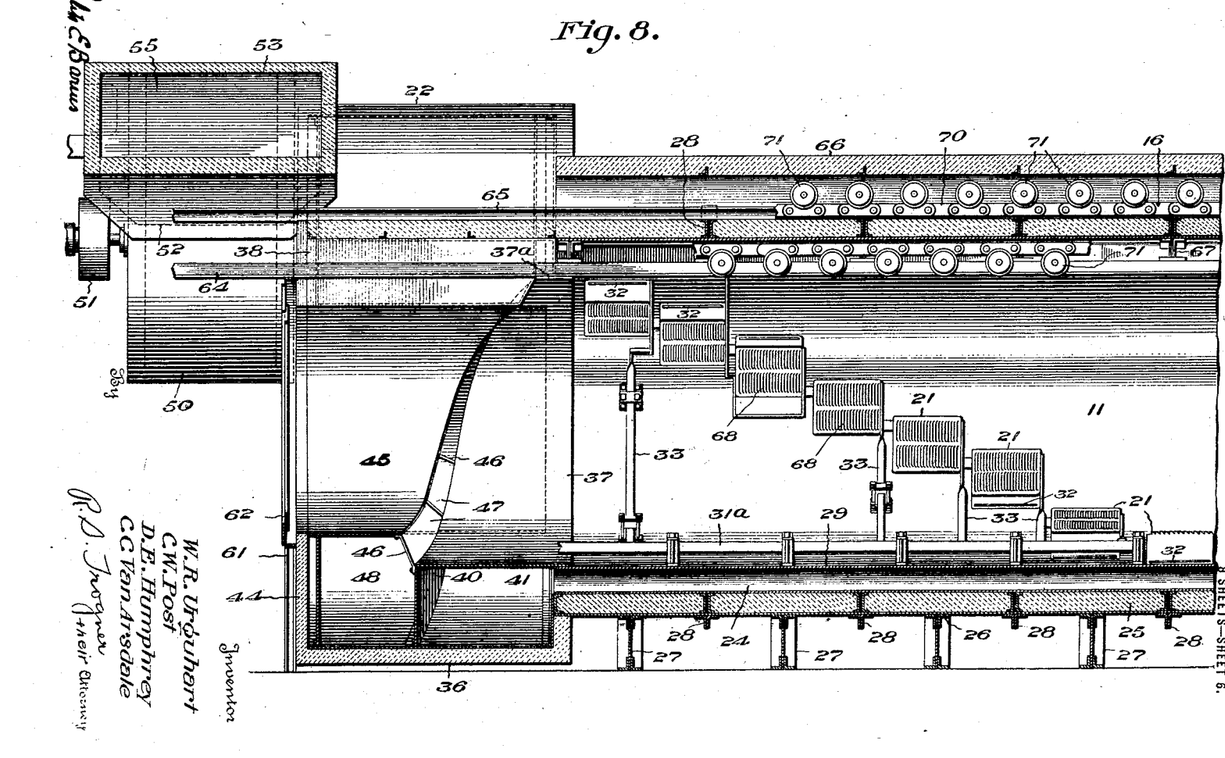
Figures 8 and 9 are, respectively, vertical sectional views looking in the direction of the arrows VIII and IX of Figure 6, and illustrating, in sectional view, both the right and left-hand sections of the entrance to the oven.
Figure 9:
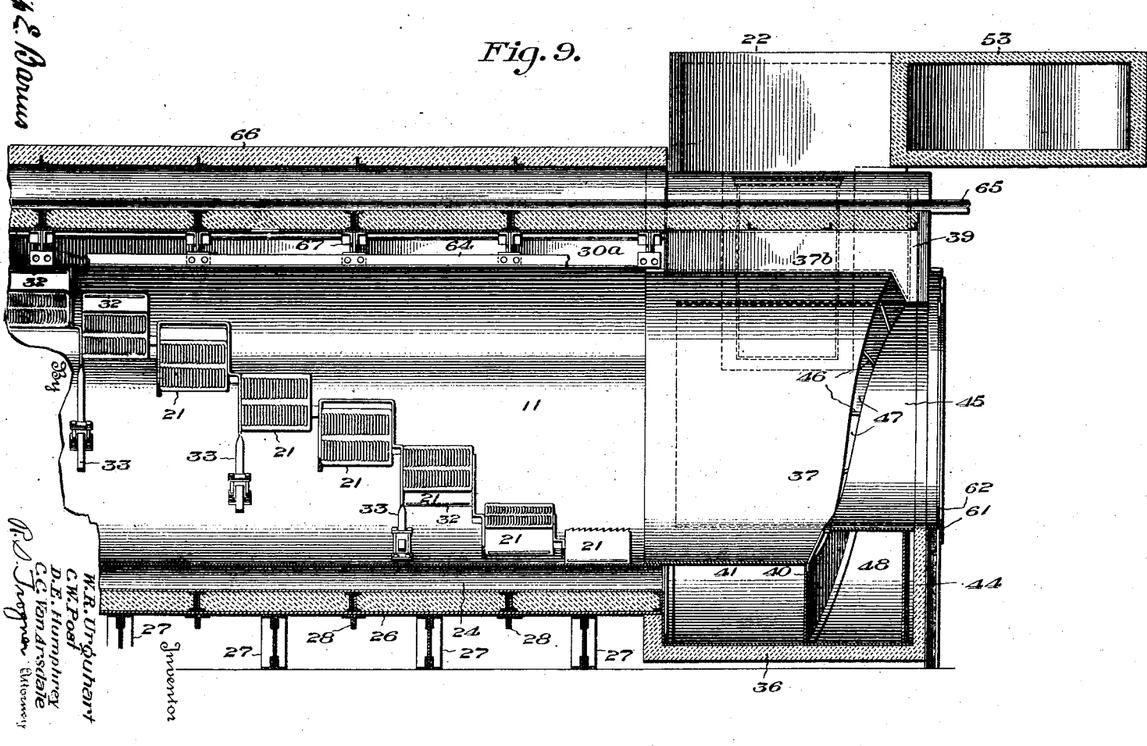

The circulation unit 22 is shown in sectional view in Figures 8 and 9 that are taken looking in a left-hand and in a right-hand direction respectively from the central vertical sectionalizing plane, indicated by the dotted lines VIII—VIII and IX—IX and the associated arrows of Fig. 6 of the drawings.

Referring particularly to Figures 6, 8 and 9 of the drawings, the circulation apparatus 22 comprises a cylindrical shell 36 which is of larger diameter than the outer wall 25 of the oven and forms a continuation thereof. A metal shell 37, which constitutes a continuation of the inner oven shell 29, is of uniformly tapered width from its narrow edge 37$^a$, where it joins a vertical longitudinal plate 38, to its widest portion 37$^b$ that terminates at a vertical plate 39. The longitudinal duct partitions 30$^a$ and 30$^b$ along the crest of the oven are respectively connected to the vertical plates 38 and 39. A radial partition 40 extends from the outer edge of the shell 37 to the wall 36 of the ventilation cap to form a pressure manifold 41 that communicates with each of the ducts 24 and which has a tapered section that provides for a uniform circulation of air through the several channels 24. The outer end of the cylindrical shell 36 is partially closed by a radial wall 44 and a split cylindrical shell 45 that is of less diameter than the inner wall 29 of the oven and which extends from the wall 44 substantially to the termination of the shell 37. The shell 45 is spaced from the shell 37 by a series of brackets 46 that serve to support the inner edge of the shell 45 and provide a series of openings 47 through which air may be exhausted from the oven. The split cylinder 45 is also connected to the plates 38 and 39 at the top of the oven. The shell 45, the wall 44, the cylinder 36 and the partition 40, together define an exhaust manifold 48 of tapered section that serves to exhaust air from the oven through the openings 47.

A fan 50, of conventional design, has a pressure port 52 that communicates with the pressure manifold 41 through an angular channel 53 and an aperture 54, shown in dotted outline that is cut through the cylindrical shell 36 of the ventilation cap. A damper 55 is interposed between the pressure port of the fan and the angular channel 53 to provide means for regulating the flow of air to the pressure manifold. The fan 50 also has an exhaust port 56 which communicates with the exhaust manifold 48. The fan 50 is driven from a pulley wheel 58 that is mounted on a fan shaft 59 carried by an overhead bracket 60.

Each end of the oven has a plate 61 fitted thereon which carries a flexible annular disc 62, of fabric or other material, that serves, in conjunction with the annular tire casing molds 12 which traverse the oven, to partially seal the oven opening.

The oven also has a pair of overhead conveyor tracks 64 and 65 extending therethrough for supporting the overhead chain conveyor 16 from which the molds 12 are suspended by hooks 73 during their passage through the oven. The upper tracks 65, for the return portion of the conveyor, are housed in a longitudinal channel 66 and the section of track 64 within the oven is supported from the top of the oven by brackets 67. Each of the molds 12 comprises mating sections 12$^a$ and 12$^b$ which are secured together to define a molding cavity. The particular type of mold is, however, immaterial to our invention since any suitable construction may be employed that imposes the required pressure upon the enclosed casing during its vulcanization without the use of external pressure devices for maintaining the proper mating of the molds.

The oven conveyor comprises a chain 70 that is supported from a series of rollers 71 that traverse the overhead tracks 64 and 65. Oppositely disposed rollers 71 are mounted on a transverse pin 72 by which means the hooks 73, which support the mold sections 12 while they are being moved through the oven, are engaged by the conveyor chain. The conveyor chain 16 passes over an adjustable idler sprocket wheel 74 and a driving sprocket 75 at the entrance to the oven and over a driving sprocket wheel 76 at the exit to the oven. This conveyor is driven from the sprocket wheels 75 and 76 in a manner later to be described.

The molds are suspended from the overhead oven conveyor 16 by means of a series of hooks 73, each of which comprises a mold-engaging hook 73$^a$, a transverse pin 73$^b$ on which a pair of rollers 73$^c$ are mounted and which extend beyond the rollers, and a hook 73$^d$ that engages the overhead conveyor mechanisms to support the molds 12 while they are moved through the oven.

A bed conveyor 80, of conventional link-belt design as shown in Figures 1 and 2 of the drawings, extends from the "unloading" conveyor mechanism 18 to the "loading" mechanism 17 and serves to return the molds 12 from the exit to the entrance of the oven during their continuous cycle of operation.

A driving motor 81 is connected to a pair of driving sprockets 82 for operating the conveyor 80 by means of a gear train embodying a worm gear set 83 which drives a train of gear wheels 84, 85 and 86 that are supported in pairs of standards 87 and 88. The forward end of the bed conveyor 80 extends over sprocket wheels 82 by means of which it is driven and its rear end passes over a pair of idler sprockets 89. A pair of horizontal tracks 90 constitutes a bed on which the conveyor travels.

The molds 12 are received from the bed conveyor 80 by a roller conveyor 95 that forms a portion of the loading mechanism 17. The roller conveyor 95 comprises a series of rolls 96 that are journalled in pairs of supports 97 and 98 and are driven by the motor 81 through the train of gear wheels 83, 84, 85 and 86 and a sprocket and chain connection 101. An intermediate roller 102, which is also driven from the gear 86 by a sprocket and chain connection 103, conveys the molds 12 to the roller conveyor 95 from where they are delivered to the loading mechanism shown in detail in Figures 1, 2 and 4.

Figure 4:
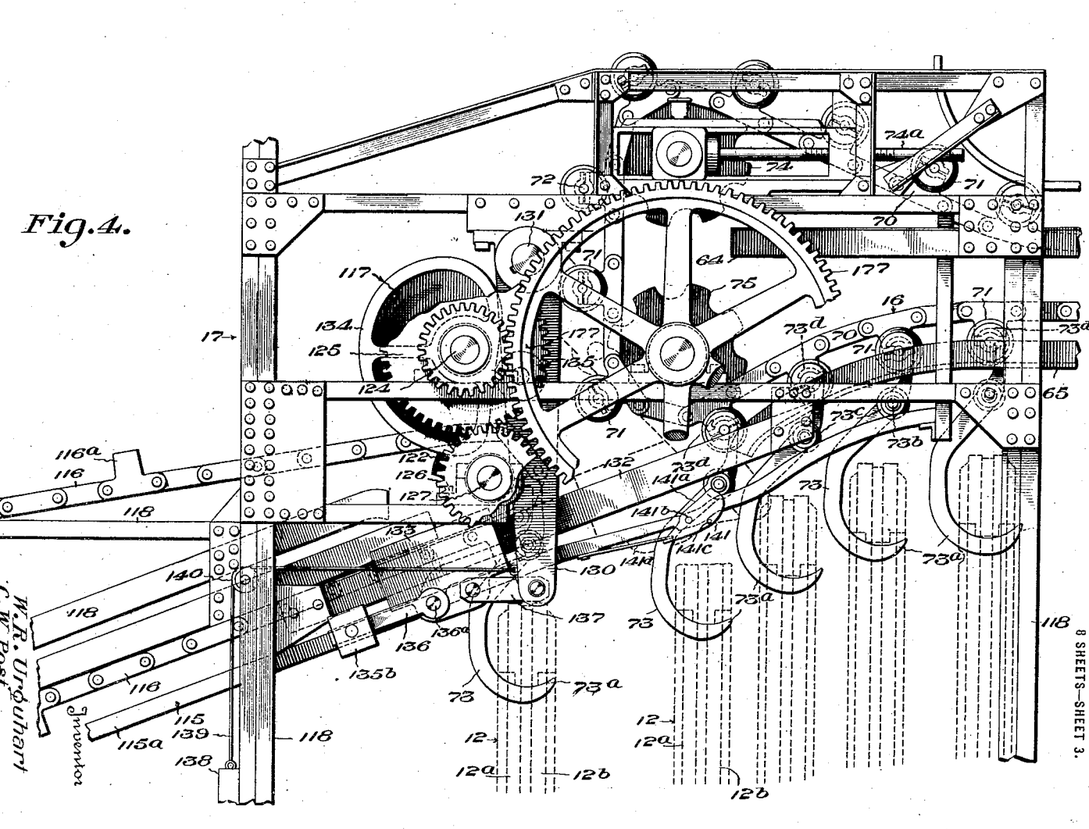
Figure 4 is a detailed elevational view, with parts broken away, of the conveying mechanism at the entrance of the oven.

This loading mechanism, which constitutes a portion of the loading conveyor 17, embodies a pair of spaced tracks 115 along which the mold supporting hooks 73 are conveyed by a chain conveyor 116 that carries a series of lugs 116$^a$, and by a cam mechanism 117 that serves to transport the molds from the chain conveyor 116 to the overhead oven conveyor 16 in a manner later to be described.

The chain conveyor 116 is of conventional design and extends over a pair of spaced driving sprockets 122 at its upper end and a pair of idler sprockets 123 at its lower end. The conveyor chains 116 are driven at a uniform rate by the sprockets 122 from a jack shaft 124 through a pair of intermediate gear wheels 125 and 126 that drive the spur shaft 127 upon which the sprockets 122 are mounted.

The inclined tracks 115 are supported from a structural framework 118 and have their lower ends 115$^a$ spaced a sufficient distance above the roller conveyor 95 to permit the mold to move beneath the lower ends of the track and to enable the mold suspending hooks 73 to travel along the tracks 115 and to drag the corresponding molds thereafter.

The rollers 73$^c$ of the supporting hooks 73 engage the tracks 115, and the series of lugs 116$^a$ on the conveyor chains engage the ends of the transverse shafts 73$^b$ of the supporting hooks to move the molds up the inclined tracks during the advancing movement of the conveyor chains 116. When the molds travel a sufficient distance up the inclined tracks, they swing free from the roller conveyor and are suspended from the tracks 115 by the supporting hooks 73, the rollers 73$^c$ of which travel along the spaced tracks and the ends of the shaft 73$^b$ of which are engaged and moved by the lugs 116$^a$.

Figure 11:
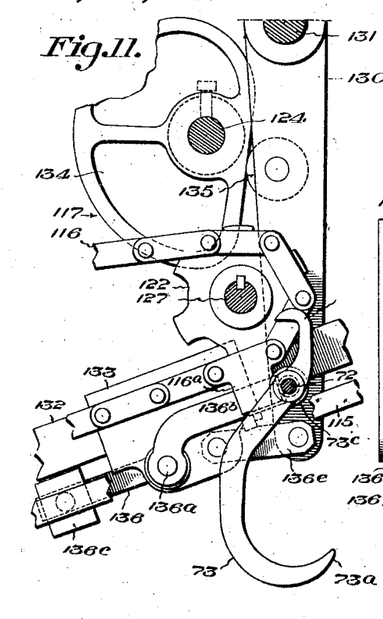
Figures 11 and 13 are fragmentary side elevational views of detailed portions of the conveying mechanism.
Figure 12:
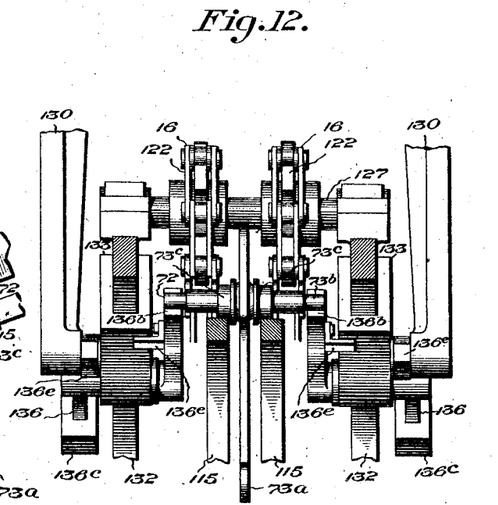
Figure 12 is a top plan view, with parts broken away, of the mechanism shown in Figure 11.

The cam mechanism 117, detailed portions of which are illustrated in Figs. 11 and 12, embodies a pair of levers 130, one of which is mounted on each side of the conveyor chains and each of which is mounted on one end of a spur shaft 131, the latter being journalled in the supporting frame 118. A guide rail 132 is mounted on each side of the conveyor chain 116 and each is adapted to define the movement of a reciprocating block 133 that is slidably mounted on one of the guide rails 132 and is reciprocated between its positions indicated by the solid lines and broken lines by the movement of the corresponding lever 130, which is actuated from a cam 134 through a roller 135 that is mounted on the lever 130, and a link connection 137 that serves to connect the lever 130 with the reciprocating block 133.

The guide rail 132 is rigidly connected to the framework 118 at its respective ends and is disposed substantially parallel to the inclined tracks 115 and laterally and upwardly offset therefrom. The slide block 133, that is mounted on the guide rail 132, carries a weighted arm 136 that is pivotally mounted in the guide block by means of a pin 136$^a$ and comprises a mold-engaging end 136$^b$ that serves as a latch to engage the respective ends of the transverse shaft 73$^b$ of the supporting hook 73. A counterbalancing weight 136$^c$ balances the arm 136$^b$ toward its uppermost position and thus enables the arm to engage these pins 73$^b$ of the supporting hooks when the block 133 is moved down the incline a sufficient distance for the arm 136$^b$ to pass underneath the pin 73$^b$ of the supporting hook and to engage the pins 73$^b$ on the return up stroke of the levers 130. A lug 136$^e$ limits the upward movement of the arm 136$^b$ to the position shown in the figures of the drawings. The movement of the block 133 is controlled by the cam 134 that is directly mounted on the shaft 124 and driven in a manner later to be described. The operation of the cam 134, which is in a right hand direction, as found in Fig. 4, causes the arm 130 to travel at a substantially uniform rate up the incline and to return from its uppermost position to its lowermost position, as shown in solid outline, at an increased speed. The return of the arm is assisted by means of a counterbalancing weight 138 that is connected to the block 133 by means of a flexible cable 139 which extends over a pulley wheel 140.

When the supporting hook 73 is moved a sufficient distance up the inclined tracks 115, a latching device 141 engages the supporting hook to retain it in its uppermost position where it may be engaged by the conveyor chain 16 and moved through the oven. The latch 141 comprises a plate 141$^a$ that is pivotally mounted on the track 115 by a pin 141$^b$ and the movement of which is limited by a lug 141$^c$. A spring 141$^d$ balances the latch to the position shown in the drawing.

Figure 5:
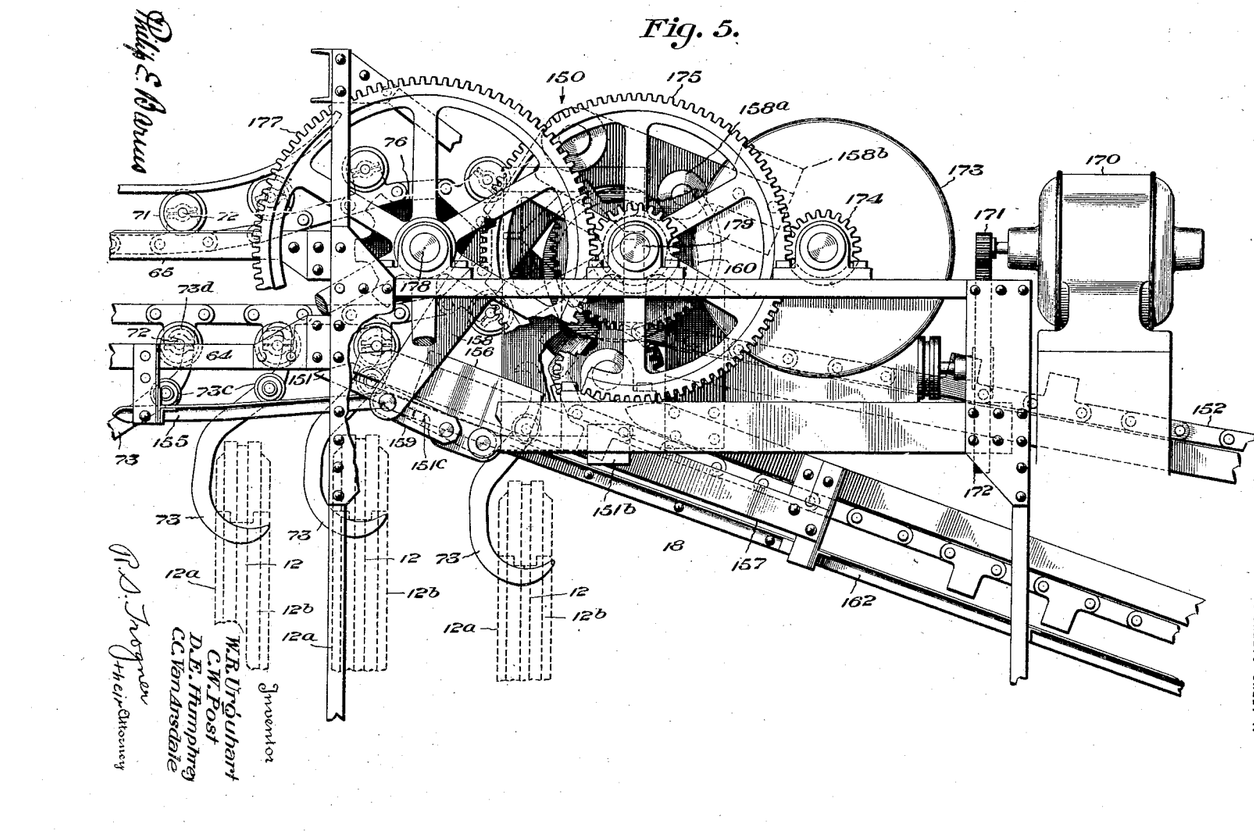
Figure 5 is a corresponding view of the mold "take-off" mechanism, or the conveying mechanism located at the exit end of the oven which receives the molds from the overhead oven conveyor and places them on a bed conveyor.

From the position of the hook 73 and the supported mold shown as engaged by the latch 141, further movement is effected by the engagement of the transverse shafts 72 of the conveyor chain 70 with the suspending hook 73$^d$ of the mold supporting hook. The rollers 71 of the oven conveyor chain engage the corresponding guide rails 64 and 65 in traversing the oven. The molds are suspended from the transverse shafts 72 of the conveyor chain 16 by the hooks 73 and are moved through the oven by the operation of the conveyor chain 16 and delivered at the exit of the oven to the take-off mechanism 18 that is shown in Figs. 1, 3 and 5 of the drawings.

The idler pulley 74 is moved laterally by means of a slide rod 74$^a$ to remove any slack that may develop in the conveyor chain 16.

The take-off mechanism, which is shown in Figs. 1, 3, 5 and 13, operates in a manner very similar to the manner of operation of the loading mechanism and embodies a cam-operated mechanism 150 that controls the movement of a hook 151 that passes under and latches with the several supporting hooks 73 as they emerge from the oven to drag such supporting hooks to a position where they may be engaged by a conveyor chain 152 that serves to move the molds to a position where they are received by the roller conveyor 153.

As the supporting hooks with their suspended molds emerge from the oven, the rollers 73$^c$ engage an upwardly inclined track 155 that serves to raise the hooks 73 in such manner that the conveyor engaging hook portion 73$^d$ is disengaged from the transverse rod 72 to permit the removal of the hook from the chain conveyor 16 by the operation of the reciprocating latch 151.

Figure 13:
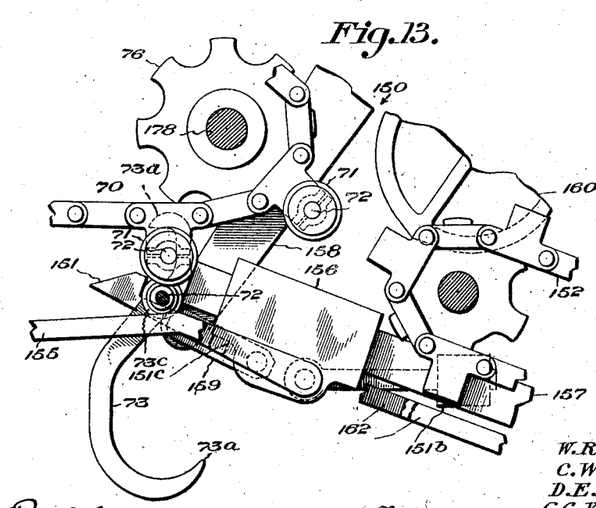

The latch 151 is pivotally mounted on a slide block 156 that is adapted to reciprocate on a guide rail 157 in a manner similar to the operation of the block 152 previously described. A pivotally mounted arm 158 is connected to the block 156 by a link 159 and is actuated by a cam wheel 160 through the engagement of the cam roller 158$^a$ with the wheel 160. The roller 158$^a$ is mounted on an upper offset portion of the arm 158 which also carries a weight 158$^b$ that balances the arm toward its uppermost position, as shown in solid outline in the drawing. A counterbalancing weight 151$^b$ holds the latch 151 in engagement with the transverse shaft of the supporting hook 73 when in the position shown in the drawing. A lug 151$^c$ limits the upward movement of the latch 151 by engagement with the block 156.

When the reciprocatory movement of the latch 151 drags the supporting hook 73 over the end of the inclined track 155 to a position on the pair of inclined rails 162, the weight of the mold causes it to move down the rails 162 to the foremost position indicated for the molds in Fig. 5. The conveyor chains 152 control the movement of the molds down the inclined tracks 162 and delivers them to the roller conveyor 153. A set of rails 163 are positioned underneath the tracks 162 and constitute a skidway over which the molds may be dragged by the conveyor chain 152 to change their position from one of suspension to a horizontal position on the roller conveyor 153.

The unloading mechanism 18 is driven from an electric motor 170 through a pair of gear wheels 171, 172 and a worm gear set 173 that drives the gear train 174, 175, 176 and 177. The gear wheel 177 is mounted on a shaft 178 and serves to drive the oven conveyor chain through the sprocket wheel 76. The gear wheel 175 is mounted on the shaft 179 and serves to drive the cam 160 which controls the reciprocatory movement of the block 156 through engagement with the cam wheel 158$^a$.

The gear wheel 175 is mounted on the shaft 179 and serves to drive a sprocket wheel 182 that synchronizes the operation of the unloading mechanism 18 with the loading mechanism 17 located at the entrance to the oven. The chain 183, one end of which extends over the sprocket wheel 182 and the other end of which extends over a corresponding sprocket wheel 184, located at the entrance of the oven as shown in Figures 2 and 3, serves to drive the shaft 124 of the loading mechanism 17. This mechanism also synchronizes the operation of the unloading mechanism with the loading mechanism to insure uniform spacing and operation of the conveying system.

The molds are received by the roller conveyor 153 after they are dragged by the chain 152 a sufficient distance to place them on the series of rollers 185.

The roller conveyor 153 is very similar to the conveyor 95 that was previously described in conjunction with Figure 2 of the drawings and embodies a pair of jack shafts 186 and 187 that are geared together by gear wheels 188 and, are driven from the worm gear set 173 through the shaft 189 and sprocket wheels 190 and 191 over which a chain 192 extends.

The roller conveyor 153 conducts the molds from the unloading end of the conveyor portion 18 to the bed conveyor 80 by means of which they are carried to the mold-separating portion 19 of the conveyor system, as indicated in Fig. 1 of the drawings. The separating portion of the conveyor is of conventional design embodying an overhead conveyor 195 that carries a series of hooks 196 from which the upper portion 12$^a$ of the mold sections are suspended, thus leaving the lower portion of the opened mold in position on the bed conveyor. The cured tire casing, or other rubber article, is thus removed from the mold and a new, uncured article placed within the mold. When the separated mold sections move a sufficient distance along the conveying section 19, the mold sections are again mated and secured for another cycle of treatment in the oven.

The overhead conveyor 195 is driven from the gear wheel 84 of the loading portion 17 of the conveyor by means of a chain 197 that extends over sprocket wheels 198 and 199 and which is carried in horizontal guide brackets 200 that have a series of idler rollers 201 for reducing the strain on the chain. The sprocket wheel 199 drives a sprocket wheel 202 over which the chain 195 extends. An idler sprocket 203 is placed at the remote end of the chain 195 and serves as a guide therefor.

The operation of our invention may best be described by tracing the movement of an individual mold, which has been supplied with an uncured rubber article, through the curing oven. Such a mold 12 is carried by the bed conveyor 80 from the mold assembly unit 19 to the roller conveyor 95 and delivered to the loading mechanism 17 at the entrance to the curing oven. The mold is here engaged by the supporting hook 73 and dragged over the remaining rollers of the conveyor 95 until the mold swings free from the bed conveying mechanism and is supported on the inclined rails 115 of the loading mechanism. The conveying chains 116 move the mold sections up the inclined tracks 115 until the reciprocating arm 136$^b$ engages the transverse pins of the supporting hook to transfer the molds from the conveyor chains 116 to the overhead oven conveyor 16 in the manner described. The mold is then swung from the transverse pins 72 of the oven conveyor and carried through the oven in this position.

It is assumed that the oven is heated to a proper temperature by means of the plurality of electrical heating units disposed therein and that this temperature is maintained within predetermined limits by the operation of a potentiometer temperature regulator. The air thus heated is circulated through the oven by the operation of the fan mechanisms 22 and 23. The length of the oven and the speed of operation of the overhead conveyor chain 16 are so regulated that the molds are maintained in the heated atmosphere of the oven a sufficient time to completely vulcanize or cure the articles being treated.

The mold is then delivered to the unloading mechanism 18 and moved by the roller conveyor 153 to the bed conveyor 80. The bed conveyor 80 conducts the mold with its cured rubber article to the mold opening portion of the conveyor 19 where the upper portion of the mold 12$^a$ is lifted out of engagement with the lower portion 12$^b$, the mold-fastening devices having been loosened, after which the cured rubber article is removed therefrom. The molds are now in condition to receive another uncured article and to again traverse the oven in their continuous cycle of operation.

The various changes and alterations that may be made in a structure of this nature will be apparent. However, it is deemed desirable to set forth a few of these variations that may be made, such, for instance, as the circulation of an atmosphere through the oven that would effect certain changes in the rubber article or that would recover solvent used in the manufacture of such articles or for reasons of like nature. It may also be desirable at times to avoid the use of metallic molds and to conduct the articles through the oven without the encasing mold structure.

Particular mention should be made of the increased temperature that is employed at the entrance to the oven in order that the articles to be vulcanized may more quickly be heated to a vulcanization temperature. By separating the various heating elements of the oven into independent groups the successive temperatures to which the article is exposed can be closely controlled.

Although we have described a single preferred form of our invention, together with certain minor modifications of the detailed parts thereof, obviously other forms of our invention may be as desirable as those disclosed and we desire, therefore, that only such limitations shall be imposed as are indicated in the accompanying claims, it being our intention to protect our invention as fully and as completely as the prior art may permit.

What we claim is:

1. An apparatus for treating rubber articles comprising, an oven, means for successively and continuously moving tire casings through the oven, and means for repeatedly circulating the same air through the oven.

2. The combination with a tubular heating oven open at both ends, of means for repeatedly circulating the same air through said oven in a predetermined path.

3. The combination with a tubular heating oven open at both ends, of means external to the oven for maintaining a forced circulation of the air through the oven in a predetermined course.

4. The combination with a heating oven, of a plurality of air ducts longitudinal of the oven, each of said ducts being adapted to supply air to a different portion of the oven.

5. The combination with a heating oven of substantially tubular shape, of a plurality of air ducts extending longitudinally of the oven and communicating therewith.

6. The combination with a heating oven of substantially cylindrical shape, of a plurality of air ducts communicating with the oven and arranged longitudinally of the oven in side by side relation, said ducts being arranged in two independent groups, each group co-operating with a portion of the oven and having the duct openings disposed at the corresponding end of the oven.

7. The combination with a heating oven of substantially tubular shape, of a plurality of longitudinal air ducts communicating with the oven and arranged around the oven in side by side relation, said ducts being arranged in independent groups, and a separate damper device for controlling the quantity of air traversing each group.

8. The combination with a heating oven, of a system for circulating air through the oven, comprising a plurality of ducts for admitting air to the oven at uniformly positioned stations along its length, and a duct for withdrawing air from the oven at one end thereof.

9. The combination with a heating oven of tubular shape, of a plurality of longitudinal air ducts communicating with the oven at regularly spaced intervals, and means for circulating air from the oven through the ducts and for returning the air to the oven.

10. The combination with a heating oven of tubular shape having receiving and discharging openings at the respective ends thereof, of an air duct longitudinal of the oven and communicating therewith at regular intervals, and means for exhausting the air supplied through the duct through one of said openings.

11. The combination with a tubular heating oven of a system of gas circulation therefor comprising, an exhaust manifold for receiving gas from the oven, and a supply manifold connecting with the oven for returning gas received through the exhaust manifold to the oven.

12. The combination with a tubular heating oven, of a system of circulation therefor comprising, an exhaust manifold disposed relatively near the entrance of the oven, means for exhausting fluid from the oven through the manifold, a second manifold for receiving the fluid thus exhausted, and a channel communicating with a portion of the oven relatively distant from the entrance thereof and with the second manifold for returning the fluid to the oven.

13. The combination with a tubular heating oven of a fluid circulation system therefor, comprising means for exhausting fluid from the entrance of the oven, and a communicating passageway for returning the fluid thus exhausted to the interior of the oven.

14. The combination with a tubular oven having a permanently open end adapted to receive the articles to be treated, of means for exhausting gas from the oven, a supply manifold for receiving the gas thus exhausted, and a plurality of passageways communicating with regularly arranged openings into the oven for returning the gas thereto, said openings being spirally arranged within the oven.

15. The combination with a tubular oven having a permanently open end adapted to receive the articles to be treated, of means for exhausting gas from the oven, a supply manifold for receiving the gas thus exhausted, and a plurality of passageways communicating with regularly arranged openings into the oven for returning the gas thereto, certain of said openings being spirally arranged within the oven, certain other of the openings being supplementary to the main openings and arranged relatively near the opening of the oven to materially increase the proportionate openings thereat.

16. The combination with a tubular oven having a permanently open end adapted to receive the articles to be treated, of means for exhausting gas from the oven, a supply manifold for receiving the gas thus exhausted, and a plurality of passageways communicating with regularly arranged openings into the oven for returning the gas thereto, and deflectors arranged within said openings for directing the flow of gas within the oven.

17. The combination with a tubular oven having a permanently open end adapted to receive the articles to be treated therein, of means for exhausting gas from the oven, a supply manifold for receiving the gas thus exhausted, and a plurality of passageways communicating with regularly arranged openings into the oven for returning the gas thereto, said ducts being circumferentially arranged about the oven.

18. The combination with a tubular oven having a permanently open end adapted to receive the articles to be treated, of means for exhausting gas from the oven, a supply manifold for receiving the gas thus exhausted, and a passageway communicating with regularly arranged openings into the oven for returning the gas.

19. The combination with a tubular oven, of means for exhausting gas therefrom, a manifold for receiving the gas thus exhausted, a plurality of connecting passageways extending from the supply manifold to regularly arranged openings into the oven for returning the gas to the oven, and means for adjusting the relative flow of gas through the various passageways.

20. The combination with a tubular oven, of means for exhausting gas therefrom, a manifold for receiving the gas thus exhausted, a plurality of connecting passageways extending from the supply manifold to regularly arranged openings into the oven for returning the gas to the oven, and means for heating the gas before it is returned to the oven.

21. An apparatus for treating rubber articles comprising, a tubular oven having open ends, means for moving a plurality of rubber articles successively and continuously through the oven, and means for maintaining a comparatively higher temperature relatively near the entrance to the oven than elsewhere along its length.

22. An apparatus for treating rubber articles comprising a tubular oven having open ends, a conveyor traversing the oven for successively and continuously transporting the articles to be treated therethrough, means for loading the articles on the conveyor, and means for unloading the articles from the conveyor after they have traversed the oven, and means for synchronizing the loading and the unloading mechanism.

23. An apparatus for treating rubber articles comprising a tubular oven, a conveyor element traversing the oven for transporting the articles to be treated therethrough, a plurality of molds for enclosing the articles to be treated, a second conveyor element external to the oven for returning the molds from the unloading end of the oven to the loading end of the oven, and a swingable transfer arm pivotally mounted between the conveyors for transporting the mold members from the first conveyor element to the second conveyor element.

24. An apparatus for treating rubber articles comprising a tubular oven having open ends, a conveyor traversing the oven for transporting the articles to be treated therethrough, a plurality of molds for enclosing the articles to be treated, a second conveyor external to the oven for returning the molds from the discharge end of the oven to the charging end of the oven, and a swingable transfer arm pivotally mounted between the conveyors for transporting the mold members from the first conveyor element to the second conveyor element, the operation of the transfer arm being controlled in accordance with the operation of the first conveyor.

25. An apparatus for treating rubber articles comprising, an oven heated to vulcanizing temperature, means for successively and continuously moving tire casings through the oven, and circulating means for maintaining a continuously circulating atmosphere for enveloping the tires during their travel through the oven.

26. An apparatus for treating rubber articles comprising, an oven, means for successively and continuously moving tire casings through the oven, and means for enveloping the tires in a continuously circulating atmosphere during their travel through the oven, the path of circulation of the atmosphere being in spiral form starting intermediate the ends of the oven and continuing in opposite directions toward the respective ends of the oven.

27. An apparatus for treating rubber articles comprising, an oven, means for successively and continuously moving tire casings through the oven, and circulating means disposed at each end of the oven for maintaining a continuously circulating atmosphere through the oven, the circulating medium being exhausted from the oven and returned thereto.

28. An apparatus for vulcanizing rubber articles comprising, a tubular heating oven, a traveling conveyor traversing the oven, means for successively and progressively mounting a series of molds on the conveyor, and means synchronized with the loading means for removing the molds from the conveyor after they have traversed the oven.

29. A vulcanizing apparatus comprising a tubular oven, a plurality of molds adapted to successively and repeatedly traverse the oven, a conveyor system comprising an overhead conveyor for transporting said molds through the oven, means associated with the conveyor for loading and unloading the molds from the overhead conveyor component, and means for synchronizing the loading and unloading mechanisms at the entrance to the oven with the unloading mechanism at the discharge end of the oven.

30. An apparatus for treating rubber articles, comprising, a tubular oven heated to a vulcanizing temperature and having open ends, a conveyor traversing the oven for transporting the rubber articles therethrough, a plurality of heating elements spirally arranged within the oven, and means for enveloping the articles in a continuously circulating atmosphere during their travel through the oven.

31. An apparatus for treating rubber articles comprising, a tubular oven, a conveyor traversing the oven for transporting the rubber articles therethrough, and a plurality of heating elements spirally disposed within the oven.

32. The combination with an oven having a plurality of longitudinal ducts, a plurality of heaters interposed between the ducts and the oven, and damper means for regulating the quantity of air conducted through each of the heating devices.

33. The combination with an oven having a plurality of longitudinal ducts, a plurality of heaters interposed between the ducts and the oven, and damper means for regulating the quantity of air conducted through each of the heating devices, a greater number of heating units being located near the entrance to the oven than elsewhere along its length.

34. The combination with an oven, of a plurality of independent aid ducts arranged longitudinally of the oven and each having a communicating passageway leading into the oven and a heating device interposed in each communicating passageway.

35. The combination with an electric oven of a plurality of heaters for said oven, a plurality of ducts for supplying air to said oven, one of the heaters being interposed in each of the air ducts, and means for regulating the quantity of air traversing each of said heaters.

In witness whereof, we have hereunto signed our names in the presence of two subscribing witnesses.

W. R. URQUHART.
CLIFFORD W. POST.
DWIGHT E. HUMPHREY.
CLARENCE C. VAN ARSDALE.

Witnesses as to W. R. URQUHART:
C. P. TEDFORD,
F. S. HADFIELD.

Witnesses as to CLIFFORD W. POST, DWIGHT E. HUMPHREY, and CLARENCE C. VAN ARSDALE:
J. E. KEATING,
L. M. HARTMAN.